METHOD OF PREPARING AND PRESENTING ASSEMBLING INSTRUCTIONS BY PICTORIAL REPRESENTATIONS

Filed June 17, 1957 2 Sheets-Sheet 1

INVENTORS
C. J. BUTLER
L. D. ERMISH
J. W. LINSLEY JR.
D. F. THOMAS
BY R. P. Miller
ATTORNEY METHOD OF PREPARING AND PRESENTING ASSEMBLING INSTRUCTIONS BY PICTORIAL REPRESENTATIONS Filed June 17, 1957 2 Sheets-Sheet 2

INVENTORS
C.J.BUTLER
L.D.ERMISH
J.W.LINSLEY JR.
D.F.THOMAS
BY R.P. Miller
ATTORNEY 2,917,834
Patented Dec. 22, 1959

2,917,834

METHOD OF PREPARING AND PRESENTING ASSEMBLING INSTRUCTIONS BY PICTORIAL REPRESENTATIONS

Chester J. Butler and Lawrence D. Ermish, Naperville, John W. Linsley, Jr., Downers Grove, and Donald F. Thomas, Hinsdale, Ill., assignors to Western Electric Company, Incorporated, New York, N.Y., a corporation of New York Application June 17, 1957, Serial No. 666,184

9 Claims. (Cl. 35—8)

This invention relates to a method of preparing and presenting assembling instructions by pictorial representations, and more particularly to a method for preparing a film strip containing a number of frames depicting a sequence of wiring instructions and projecting images from the film onto a screen to apprise an assembly worker as to the sequence and mode of a series of wiring operations.

In performing complex assembling operations and in wiring complex circuits, it is necessary to prepare detailed drawings showing all assembling and wiring operations. Obviously, where the assembling operations are complex the resulting drawings are very difficult to interpret. This situation is particularly true in wiring banks of telephone switching relays where many wires are positioned in overlapping and crossing relationship. In order that the wiring diagrams may be utilized, it is necessary that supplementary detailed written instructions be provided. In order for the worker to utilize the drawings and the written instructions, it is necessary that constant reference be made both to the drawings and to the written instructions. Where employees are being trained to perform new jobs this is a very time consuming operation. In addition, it requires the employee to interpret technical terminology that is usually included in written descriptions, further complicating and slowing down the worker's efforts.

In order to obviate these difficulties, it would be much more suitable to instruct the workers by use of separate drawings and descriptive matter for each actual assembling operation that they are required to perform. However, to prepare separate drawings and descriptive matter for each wiring operation would result in an unwieldly amount of paper resulting in more time being lost in improper handling of the paper than was lost in the use of the complex drawings and the lengthy instructions.

It is an object of the present invention to provide a simple method of assisting employees in performing a sequence of complex assembling operations.

Another object of the present invention is to provide a method of visually indicating a series of instructions that will enable a worker to assemble and wire a complex circuit.

A further object of the invention is to provide a method of preparing a film strip having a series of frames depicting representations of both the component that is to be wired and the mode of effectuating the wiring operation.

An additional object of the invention is to provide a method of preparing a film strip having instructions thereon denoting both the general and specific areas in which a wiring operation is to commence and terminate, together with instructions as to the type and length of wire that is to be used in each wiring operation.

With these and other objects in view, the present invention contemplates a method of preparing a color film strip containing a series of frames depicting a sequence of instructions for wiring banks of telephone switching relays. In order to prepare the film strip a layout of the terminals of the relay banks is prepared and placed under a glass plate. Each wiring operation is then laid out on the glass plate by placing a first marker of a predetermined color and configuration in the general area where the wiring operation is to commence, and placing a second marker of a different color and configuration in the general area where the wiring operation is to terminate. A color is selected for the first marker that is indicative of the size and type of wire that is to be used and a numerical indication is placed on the marker to depict the desired length of wire. Additional small colored markers are placed respectively over the exact relay terminals that are to be connected, and a colored crayon or marking pencil is used to mark the glass to indicate the path that the wire is to follow between the relay terminals. Each illustration of a wiring operation is photographed on a color sensitive film strip.

The film strip is used to illustrate the method of wiring by projecting the image of each frame onto a screen that is positioned above a fixture for holding a bank of relays or other electrical components that are to be wired. Located adjacent to the fixture is a holder for a supply of different wires or other electrical components. The assembly worker can readily select the proper wire or component in accordance with the image displayed on the screen, and the worker then connects the wire in accordance with the instruction displayed. Following each wiring operation, facilities are provided to be actuated by the worker to advance the film strip to present the next successive image of the next wiring operation on the screen.

Other objects and advantages of the present invention will be apparent from the following detailed description when considered in conjunction with the accompanying drawings, wherein.

Figure 1:
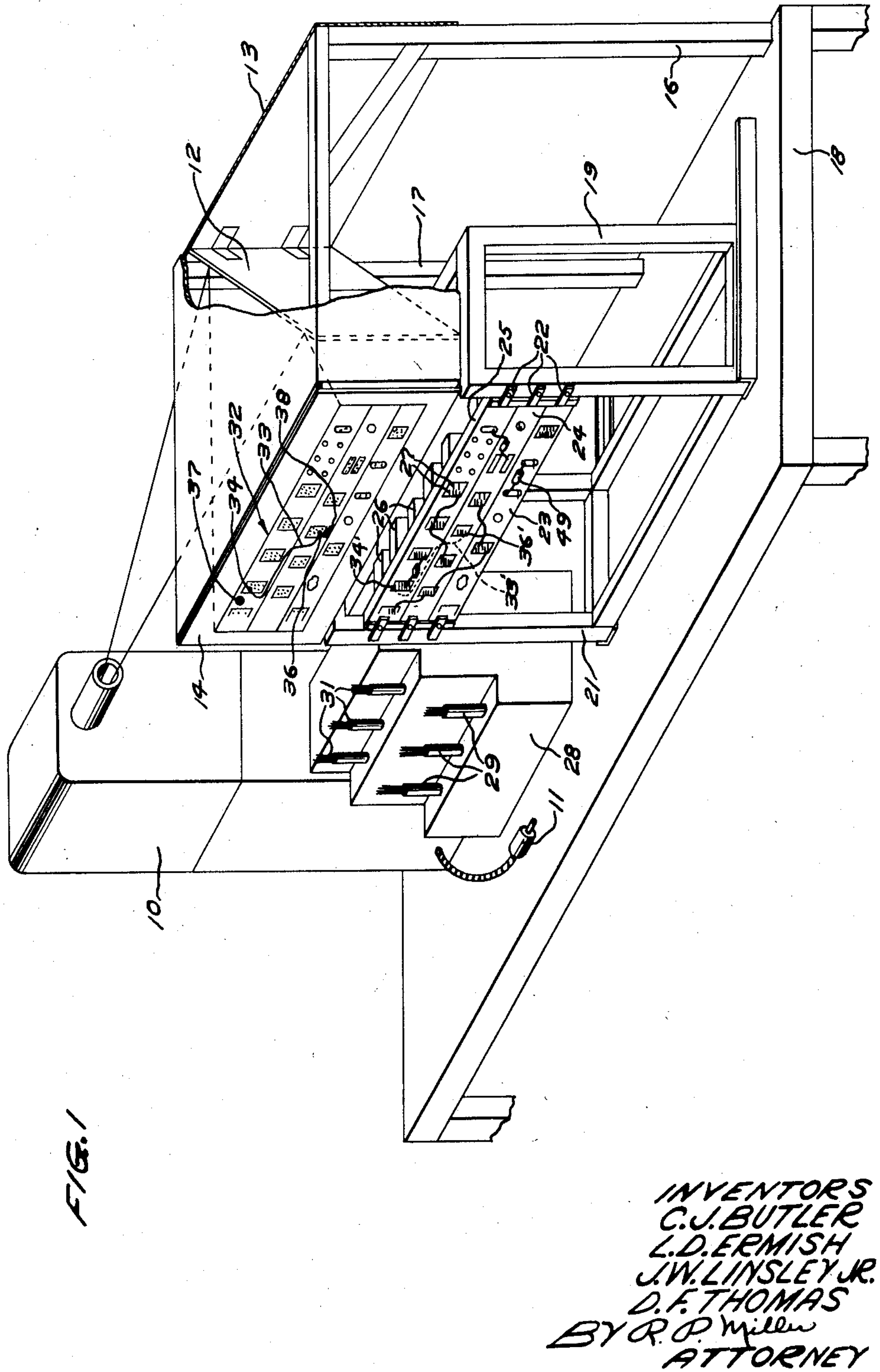
Fig. 1 illustrates an apparatus for displaying a sequence of wiring operations that may be utilized in practicing the method of the present invention.

Referring to Fig. 1, there is shown a visual display apparatus comprising a projector 10, which may be any one of several well-known commercially available types, and which is adapted to sequentially step and advance a film strip whenever an actuating switch 11 is operated. The projector 10 projects an image onto a reflector 12 that is diagonally positioned within a box 13. A ground glass or other type of screen 14 is mounted in the front of the box 13 and is adapted to receive the picture reflected by the reflector 12 and present a visual display of the pictures contained on the film strip.

The box 13 is supported by means of a pair of posts 16 and 17 secured to the top of a bench 18. Additional support is provided for the box 13 by means of a pair of rectangular brackets 19 and 21 also secured to the top of the bench 18. Selectively operable clamping devices 22 are mounted on the brackets 19 and 21 to secure a number of panels 23, 24 and 25 in position. These panels have mounted thereon banks of relays 26 or other electrical components to be wired. Each relay is provided with a series of projecting terminals 27 to which it is desired to connect wires in accordance with a predetermined pattern.

Positioned adjacent to the lefthand bracket 21 is a fixture 28 having a plurality of tubular holders 29 mounted therein. Into each of the tubular holders 29 is placed a supply of wires 31 that are of a predetermined size and length. The wires are covered by insulation of a predetermined color which may be indicative either of size or length.

In practicing the method of the invention with the apparatus shown in Fig. 1, a film strip is prepared showing each wiring operation with respect to a pictorial representation of the terminals of the relays. The film strip is loaded into the projector 10 and the switch 11 is operated to advance the first frame on the film into position so that an image is projected onto the screen 14. It will be noted that the image generally depicted by the reference numeral 32 shows one wire 33 interconnecting a terminal 34 with a terminal 36. Positioned adjacent to the terminal 34 is a dot-like indication denoting the fact that the wiring operation is to commence in this general area. The dot-like indication is of a predetermined color which denotes the color of the insulation on the wire 31 that is to be employed. There is also represented within the indication 37 a numerical designation of the length of wire that is to be used. This information apprises the attendant assembly worker as to the size and length of wire that is to be utilized. Shown adjacent to the terminal 36 is a second color visual indication 38 which denotes the general vicinity in which the wiring operation is to terminate.

In accordance with the information denoted by the visual indication 37, the attendant assembly worker selects the proper wire 31 and attaches it to the proper relay terminal 34′ by either a soldering or wire wrapping operation. The wire 31 is positioned between the other terminals and previously wired components in accordance with the path denoted by the reference numeral 33 on the screen 14. This path is shown with respect to the panels 23, 24 and 25 in dotted outline and is designated by the reference numeral 33′. Following the positioning of the wire in the desired path, the attendant assembly worker will connect the free end of the wire to the terminal designated 36′, the location of which is determined by observation of the colored indication 38 which is adjacent to the terminal specifically identified by the reference numeral 36 on the screen 14.

Figure 2:
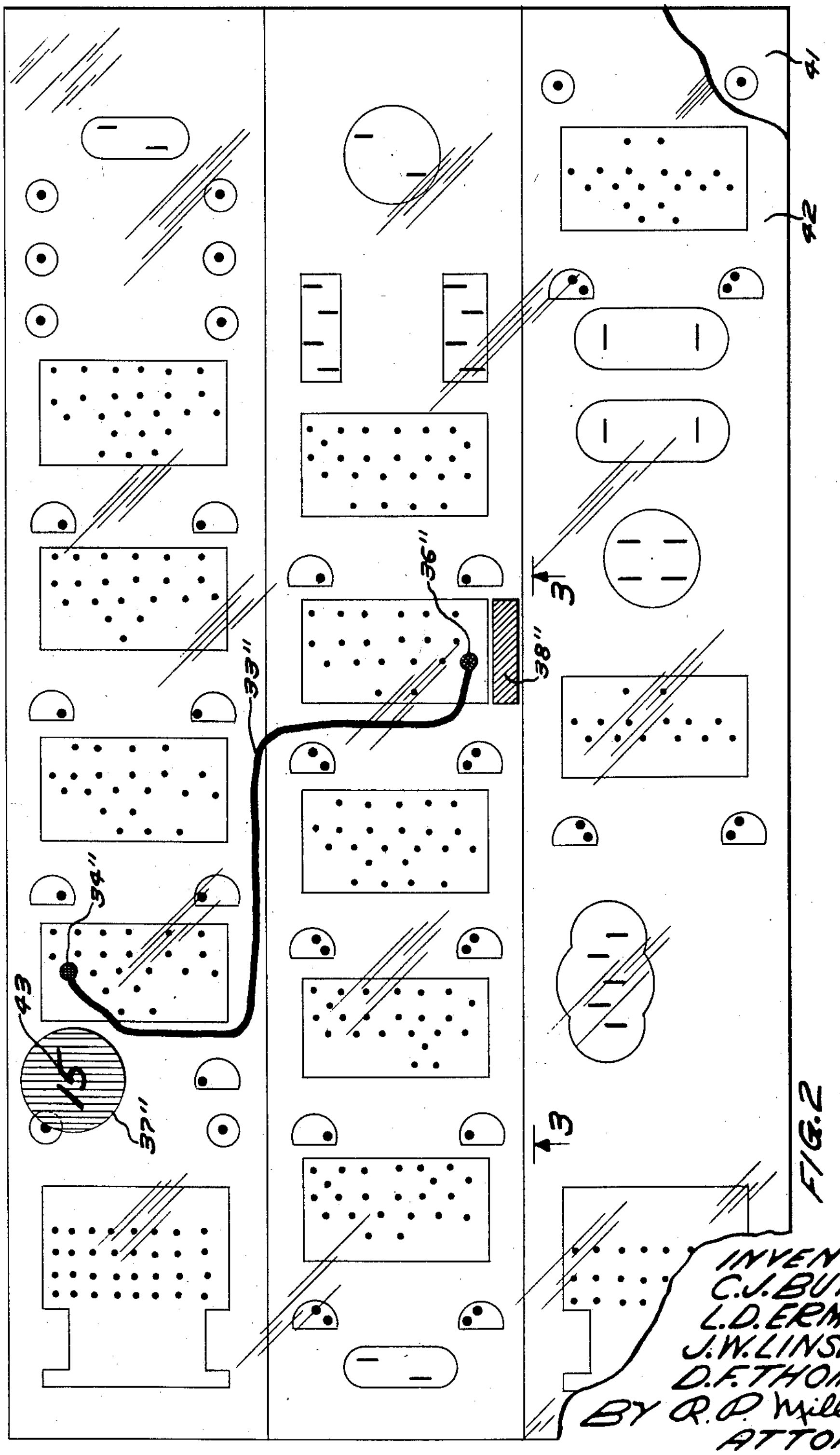
Fig. 2 illustrates a layout of a bank of relay terminals together with visual markers for use in preparing a film strip in accordance with the method of the present invention.
Figure 3:
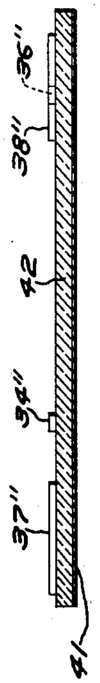
Fig. 3 is a cross-sectional view taken along line 3—3 of Fig. 2 showing the relative positions of a glass plate, a drawing and a number of markers.

Referring to Figs. 2 and 3, the method of preparing the film strip will now be explained. First a visual representation 41 is made of the terminals projecting from the banks of relays that are to be wired. This visual representation 41 may be a drawing or a photograph which is the actual size of the banks of relays. A transparent glass plate 42 is placed over the visual representation 41 and a round marker 37″ is placed thereon to indicate the general area at which the attendant assembly worker is to commence the wiring operation. The marker 37″ is colored red to indicate that the assembly worker is to select a wire having a red insulation cover. The configuration of the marker 37″ is round which indicates to the assembly worker that he is to commence the wiring operation in the general vicinity of this marker. The marker also contains a numerical designation 43 to indicate to the assembly worker that he is to select a length of wire in accordance with this designation. In the present instance, the designation is "15" consequently, the worker will select a section of wire that is fifteen inches in length. In order to precisely locate the place where the wiring operation is to commence a further marker 34″ that is orange in color is placed over the exact terminal that is to be wired.

In order to indicate the general area where the wiring operation is to be terminated, a second marker 38″, colored green, is placed on the glass 42. This marker is of rectangular shape to apprise the assembly worker that the wiring operation is to terminate in this general area. In order to precisely locate the exact terminal that is to be connected in that area, a further marker 36″, also colored orange, is placed on the glass 42 to cover the desired terminal. Next a line 33′ is drawn on the glass plate connecting the marker 34″ with the marker 36″. This line can be made by means of a crayon or marking pencil in a distinctive color. The assembled visual representation 41, the markers 34″, 37″, 36″ and 38″, and line 33″ are then photographed and a permanent record is made on a color sensitive film. In order to show subsequent wiring operations, the line 33′ is erased and the markers 34″, 37″, 36″ and 38″ are moved to indicate the new terminals to be connected and another line 33″ is drawn on the plate glass 42 to show the actual path of the next wire between those terminals. Successive photographs are made of each wiring layout so that a film strip is prepared showing the successive operations that the attendant assembly worker is to follow in wiring banks of relays.

It is to be understood that the present method can be used to facilitate assembling of other componenst such as capacitors, resistances and inductances on the terminal banks. Assemblies of these other components are depicted in Fig. 1 by the reference numeral 49. It is to be further understood that the invention may be readily adapted to perform mechanical assembling operations.

The above-described methods and arrangements of apparatus and elemental parts simply illustrative of an application of the principles of the invention and many other modifications may be made without departing from the invention.

What is claimed is:

1. A method of interconnecting a plurality of electrical terminals, which comprises the steps of projecting a wiring diagram upon a screen adjacent to a panel containing the terminals to be interconnected, said wiring diagram symbolically illustrating wires interconnecting terminals arranged in a spatial relationship identical with that in which the actual terminals are arranged, and wiring said terminals in accordance with the diagram presented upon the screen.

2. The method of wiring a terminal bank, which comprises preparing a colored film from a layout of the terminal bank having colored dots indicating the terminal whereat a desired wiring operation is to originate and a terminal whereat the wiring operation is to terminate, said layout also having markers of different color and configuration to indicate origin and termination vicinities, projecting the image on the film onto a screen to produce a visual representation, and then interconnecting terminals on the terminal bank in accordance with the visual representation.

3. The method of wiring a pair of terminals extending from banks of relays, which comprises preparing a multi-frame film strip having each frame depicting the pattern of one wiring operation and the wire to be used, successively projecting an image of each frame onto a screen, selecting wires in accordance with the projected image, and interconnecting the terminals with said selected wire in accordance with the pattern depicted in the image.

4. The method of preparing a film strip to depict a sequence of assembly operations to be performed on a piece of equipment, which comprises preparing a picture of the equipment, successively positioning a first marker of predetermined color on the picture to denote origins of assembly operations, successively positioning a second marker of a different predetermined color on the picture to denote terminations of assembling operations, and photographing in color each position of the markers on the picture.

5. The method of preparing a film strip to depict a sequence of assembly operations to be performed on a piece of equipment, which comprises preparing a picture of the equipment, successively positioning a first marker of predetermined color and configuration on the picture to denote origins of assembly operations, successively positioning a second marker of a different predetermined color and configuration on the picture to denote terminations of assembling operations, and photographing in color each position of the markers on the picture.

6. The method of preparing a film strip to depict a sequence of wiring operations to be performed on a piece of electrical equipment, which comprises preparing a pictorial representation of the electrical equipment, successively positioning a marker of predetermined color and configuration on the pictorial representation to denote the location of the origin of each wiring operation, successively positioning a second marker of predetermined color and configuration on the pictorial representation to denote the location of the terminus of each wiring operation, connecting the areas of origin and terminus with a visual marking to indicate the path of the wiring operation, and photographing in color each position of the markers and the connecting visual markings on the pictorial representation.

7. The method of wiring electrical components of an apparatus in sequential operations which comprises the steps of preparing a multi-frame film wherein each frame depicts by colored symbols and designations the precise components to be interconnected, the type and length of wire to be used and the path to be followed in starting and terminating the connection; successively projecting images of the frames of the film onto a screen in full size and in direct alignment with the components to which each wire is to be connected; selecting the aligned components in accordance with the information on the screen; and then running and connecting each particular wire between and to the selected components for each operation in sequence in accordance with the image projected on the screen from each frame.

8. The method of preparing an instruction film for wiring terminal banks, which comprises placing a first marker of a predetermined configuration and color on a layout of the terminals to be wired in the vicinity of the terminal whereat a wiring operation is to originate, placing a first colored marker over the terminal that is used to originate the wiring operation, placing a second marker of another predetermined configuration and color on the layout in the vicinity of the terminus of the wiring operation, placing a second colored marker over the terminal that is used to terminate the wiring operation, drawing a colored line between the colored markers that cover the terminals, and then photographing the layout to produce a color film of the layout, markers and line placed thereon.

9. The method of wiring a panel of electrical units, which comprises preparing a series of pictorial illustrations each showing a pair of said electrical units together with a wire connected therebetween, displaying the pictorial illustrations one at a time in a predetermined sequence, and successively attaching wires to the electrical units of an actual panel in the patterns depicted in the illustrations.

References Cited in the file of this patent

UNITED STATES PATENTS

| | | |
|---|---|---|
| 1,857,587 | Darling | May 10, 1932 |
| 2,682,117 | Wales | June 29, 1954 |